(12) United States Patent
de Oliveira et al.

(10) Patent No.: US 12,143,271 B2
(45) Date of Patent: Nov. 12, 2024

(54) DYNAMIC VIRTUAL NETWORK FUNCTION PLACEMENT IN EDGE COMPUTING ENVIRONMENTS

(71) Applicant: Dell Products L.P., Round Rock, TX (US)

(72) Inventors: Ana Cristina Bernardo de Oliveira, Rio de Janeiro (BR); Anselmo Luiz Éden Battisti, Rio de Janeiro (BR); Arthur Albuquerque Zopellaro Soares, Rio de Janeiro (BR); Débora Christina Muchaluat Saade, Rio de Janeiro (BR); Evandro Luiz Cardoso Macedo, Rio de Janeiro (BR); Flávia Coimbra Delicato, Rio de Janeiro (BR); Juan Lucas do Rosário Vieira, Rio de Janeiro (BR); Marina Ivanov Pereira Josué, Rio de Janeiro (BR); Paulo de Figueiredo Pires, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 17/822,643

(22) Filed: Aug. 26, 2022

(65) Prior Publication Data
US 2024/0073094 A1   Feb. 29, 2024

(51) Int. Cl.
*H04L 41/0895* (2022.01)
*G06F 9/455* (2018.01)
*H04L 67/00* (2022.01)

(52) U.S. Cl.
CPC .......... *H04L 41/0895* (2022.05); *G06F 9/455* (2013.01); *H04L 67/34* (2013.01)

(58) Field of Classification Search
CPC ............. H04L 41/0895; H04L 41/0823; H04L 41/0897; H04L 41/0806; H04L 67/34; G06F 9/5077; G06F 9/455
See application file for complete search history.

(56) References Cited

U.S. PATENT DOCUMENTS

2017/0318097 A1* 11/2017 Drew ................. H04L 41/0897
2020/0162323 A1*  5/2020 Abu Lebdeh ....... H04L 41/0806
(Continued)

OTHER PUBLICATIONS

Yang, Song, et al. "Recent advances of resource allocation in network function virtualization." IEEE Transactions on Parallel and Distributed Systems 32.2 (2020): 295-314.
(Continued)

*Primary Examiner* — Jungwon Chang
(74) *Attorney, Agent, or Firm* — Workman Nydegger

(57) ABSTRACT

Placing virtual network functions (VNFs) in nodes of an infrastructure are disclosed. A request for services may identify a series of VNFs. Requests may be grouped by time windows such that all requests in a time window are placed together. Placing the requests includes identifying which nodes host which VNFs. Some of the VNFs may already exist in the infrastructure. Placing the requests may include generating a placement plan that accounts, for example, for available resources, links in the infrastructure, node restrictions, service level agreements, quality of service requirements, and user priorities. Once generated, the plan is executed. Chains of VNFs can be replaced when service degrades or based on user location.

15 Claims, 9 Drawing Sheets

(56) References Cited

U.S. PATENT DOCUMENTS

| | | | |
|---|---|---|---|
| 2021/0103456 A1* | 4/2021 | Linet | G06F 9/5077 |
| 2022/0369084 A1* | 11/2022 | Joyce | H04W 40/246 |
| 2023/0130420 A1* | 4/2023 | de Mattos | H04L 41/0823 703/21 |

OTHER PUBLICATIONS

I. Benkacem, T. Taleb, M. Bagaa, and H. Flinck, "Optimal VNFs Placement in CDN Slicing over Multi-Cloud Environment," IEEE J. Sel. Areas Commun., vol. 36, No. 3, pp. 616-627, 2018.

D. Zhao, D. Liao, G. Sun, and S. Xu, "Towards resource-efficient service function chain deployment in cloud-fog computing," IEEE Access, vol. 6, No. c, pp. 66754-66766, 2018.

A. Leivadeas, M. Falkner, I. Lambadaris, and G. Kesidis, "Optimal virtualized network function allocation for an SDN enabled cloud," Comput. Stand. Interfaces, vol. 54, pp. 266-278, 2017.

C. W. Tseng, F. H. Tseng, Y. T. Yang, C. C. Liu, and L. Der Chou, "Task Scheduling for Edge Computing with Agile VNFs On-Demand Service Model toward 5G and beyond," Wirel. Commun. Mob. Comput., vol. 2018, 2018.

M. Abu-Lebdeh, D. Naboulsi, R. Glitho, and C. W. Tchouati, "NFV orchestrator placement for geo-distributed systems," 2017 IEEE 16th Int. Symp. Netw. Comput. Appl. NCA 2017, vol. 2017-Janua, No. November, pp. 1-5, 2017.

Hawilo, Hassan; Jammal, Manar; Shami, Abdallah. Network function virtualization-aware orchestrator for service function chaining placement in the cloud. IEEE Journal on Selected Areas in Communications, 2019.

Dinh-Xuan, Lam, et al. Performance evaluation of service functions chain placement algorithms in edge cloud. International Teletraffic Congress. vol. 1. IEEE, 2018.

Luizelli, Marcelo Caggiani, et al. Piecing together the NFV provisioning puzzle: Efficient placement and chaining of virtual network functions. International Symposium on Integrated Network Management. IEEE, 2015.

Hmaity, Ali, et al. Latency-and capacity-aware placement of chained Virtual Network Functions in FMC metro networks. Optical Switching and Networking, 2020.

Leivadeas, A., Kesidis, G., Ibnkahla, M., & Lambadaris, I. (2019). VNF placement optimization at the edge and cloud. Future Internet, 11(3), 69.

Jiang, C., Fan, T., Gao, H., Shi, W., Liu, L., Cerin, C., & Wan, J. (2020). Energy aware edge computing: A survey. Computer Communications, 151, 556-580.

N. Reyhanian, H. Farmanbar, S. Mohajer, and Z. Luo, "Joint Resource Allocation and Routing for Service Function Chaining with In-Subnetwork Processing," ICASSP 2020-2020 IEEE Int. Conf. Acoust. Speech Signal Process., pp. 4985-4989, 2020.

\* cited by examiner

| Network Parameters | Description |
|---|---|
| $G = (H, L)$ | Undirected graph of the physical network |
| $H = \{h_1, h_2, \ldots, h_n\}$ | Compute hosts (e.g., edge devices) within the network |
| $L = \{l_1, l_2, \ldots, l_n\}$ | All virtual links in the network |
| $b_{h_1 h_2}$ | Bandwidth of the link between $h_1$ and $h_2$ |
| $d_{h_1 h_2}$ | Transmission delay of the link between $h_1$ and $h_2$ |
| $w_{h_1 h_2}$ | Loss rate in the link between $h_1$ and $h_2$ |
| $U = \{u_1, u_2, \ldots, u_n\}$ | All the users that requests SFCs |
| $R_h = \{c_h, m_h\}$ | Set of resources of host $h$ |
| $c_h$ | CPU capacity of host $h$ |
| $m_h$ | Memory capacity of host $h$ |
| $RA_h = \{ca_h, ma_h\}$ | Set of available resources of host $h$ |
| $ca_h$ | CPU available at host $h$ |
| $ma_h$ | Memory available at host $h$ |
| $IM_h = \{vi_1, vi_2, \ldots, vi_n\}$ | List of VNF images available at host $h$ |
| $F_n$ | Represents VNFs that perform network functions |
| $F_h$ | Denotes VNFs containing high-level services |
| SLA | Comprises the maximum end-to-end packet delay |
| VNF Type | Represents a VNF that offers a specific type of service |
| VNF Instance | Represents an instance of a VNF Type |
| SFC Type | Represents a specification of a set of VNF Types |
| SFC Request | Represents a request generated by a user to process packets in a specific ordered VNF chain defined by the SFC |
| SFC Instance | The entity responsible for i) defining which VNF Instances will be used to process the users' packets, ii) providing routing information about how the packet flow will transit between the VNF Instances mapped for processing the user workload, and iii) monitoring the QoS |

Figure 1                                                 100

DYNAMIC VIRTUAL NETWORK FUNCTION PLACEMENT IN EDGE COMPUTING ENVIRONMENTS

FIELD OF THE INVENTION

Embodiments of the present invention relate to network function virtualization (NFV). More particularly, at least some embodiments of the invention relate to systems, hardware, software, computer-readable media, and methods for dynamically placing virtual network functions (VNFs) in a computing system.

BACKGROUND

Network function virtualization relates to virtualizing computing, network, and storage resources to decouple network functions from the underlying hardware. This allows the software implementations of these functions to execute on commodity hardware.

Although VNFs are used in various systems, the challenge of effectively and efficiently placing a VNF or a chain of VNFs in a system is very difficult. The challenge of placing VNFs includes selecting the most suitable nodes to which VNFs are deployed in the context of satisfying multiple requests from multiple users. Placing VNFs must also be performed in a manner that fulfils or meets both quality of service (QoS) requirements and service level agreements (SLAs). In addition, these overarching requirements should be satisfied while also achieving other goals such as optimizing the use of the service provider's infrastructure and minimizing energy consumption.

When a request (referred to herein as a service function chain request or SFC request) for a service is received, the service may require a chain of VNFs. The chain of VNFs may be referred to as a service function chain (SFC). More generally, users may submit SFC requests. The SFC requests may define a sequence of VNFs. The VNFs identified in the SFC requests are instantiated on hosts in an infrastructure. When a system is receiving multiple SFC requests from multiple users, placing the SFC requests is complicated because the SFC requests may have conflicting objectives.

More generally, the problem of placing VNFs in a suitable infrastructure must address the challenges of heterogeneity of SFC requirements, dynamic SFC requests over time, user mobility, and the heterogeneity and dynamism of available resources in the hosts of a system.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 1 discloses aspects of example parameters used in performing placement operations, including VNF/SFC placement operations in an infrastructure such as an edge computing environment;

DETAILED DESCRIPTION OF SOME EXAMPLE EMBODIMENTS

Figure 2:
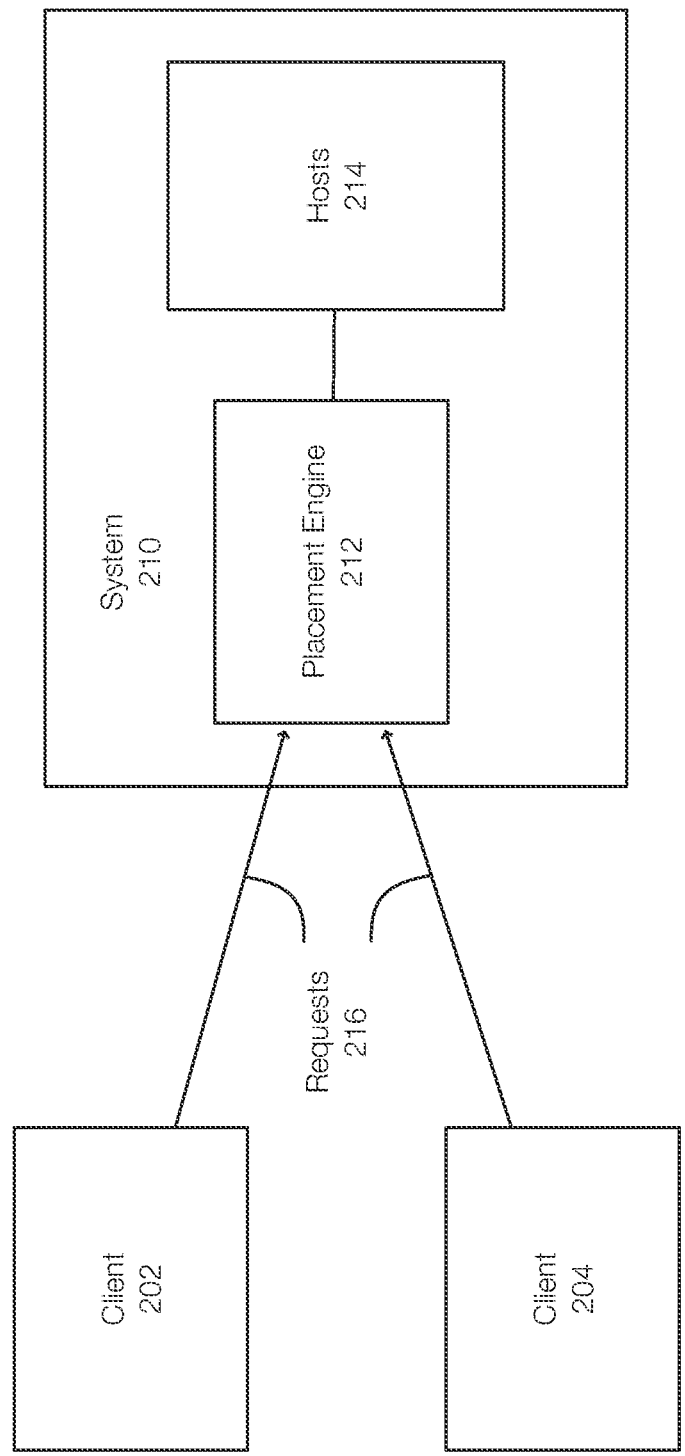
FIG. 2 discloses aspects of a placement engine configured to perform placement operations and an infrastructure in which the placement engine may operate.

Embodiments of the present invention generally relate to network function virtualization (NFV). More particularly, at least some embodiments of the invention relate to systems, hardware, software, computer-readable media, and methods for placing SFCs and virtual network functions (VNFs) in a computing environment or system. The discussion makes reference to user requests, but it is understood that the request is actually made by the user's device or client or by an agent or application operating on the device or client. The request, however, may also be generated in response to user input.

Embodiments of the invention are disclosed in the context of virtual network functions (VNFs) and/or service function chaining (SFC) but are not limited to VNFs and/or SFCs and may be applied to other requests that are performed by allocating resources in a computing environment.

Network functions may be implemented using VNFs that run on a NFV Infrastructure (NFVI). An NFV infrastructure includes all necessary software and hardware to provide the expected functionality. As discussed herein, a request from a user (or client device) may include an SFC that includes or identifies several VNFs. The VNFs identified in the SFC request may each be instantiated on one or more hosts as a VNF instance. Thus, a VNF instance provides the functionality of a VNF. The VNF instances associated with an SFC request collectively form an SFC instance. Deploying an SFC instance may include placing the VNFs as VNF instances on one or more hosts of an infrastructure.

As discussed herein, VNF instances and/or SFC instances can be shared wholly or partially. For example, two different SFC instances may use at least some of the same VNF instances. SFC instances are not required to share VNF instances.

A placement operation may include, but is not limited to, generating a placement plan, executing the placement plan, placing VNF instances, placing SFC instances, replacing VNF instances, replacing SFC instances, or the like or combination thereof.

When performing a placement operation, embodiments of the invention relate to selecting suitable hosts to run the VNFs associated with the request. Embodiments of the invention place VNFs in a manner that satisfies application QoS requirements without violating SLAs. At the same time, embodiments of the invention improve resource usage.

Because VNF placement for multiple requests may involve multiple and/or conflicting objectives, improving performance and resource usage may have multiple solutions. Embodiments of the invention provide, by way of example, a graph-based model and a VNF placement mechanism that accounts for the dynamic aspects of requests, which may be unpredictable, and user mobility. Embodiments of the invention improve/optimize resource utilization through an energy-efficient multi-level resource sharing mechanism (e.g., VNF and/or SFC instance sharing), reduce/minimize the cost for the infrastructure provider while respecting QoS requirements, dynamically place SFCs/VNFs, and are aware of user mobility.

When a request is received, the requested services (or portions thereof) may be implemented by VNFs that run on hosts in an NFV infrastructure. The VNFs needed for the request are organized into a defined order and application traffic flows through this set of VNFs, which is an example of an SFC. The SFC provides a specific service and, while operating on underlying hardware, provides the functionality required by the request or by the user.

Taking advantage of the benefits provided by NFV, the paradigms of cloud and edge computing are able to deploy VNFs on virtual machines of data centers, either far from or close to end-users, depending on which applications are considered. For instance, applications that present stringent latency requirements tend to perform better when running at edge nodes, given their proximity to users. Consequently, edge computing leads to significant benefits such as reducing communication delay, relieving network bandwidth usage, bringing control decisions to the network edge, and providing higher security and data privacy.

When integrating NFV and edge computing, VNF Instances are deployed in the hosts (e.g., nodes) of the edge infrastructure. Particularly in the context of 5G, the benefits of Edge Computing and NFV will enable service providers to meet requirements of scenarios that require ultra-reliable and low latency communication (URLLC), enhanced Mobile Broadband (eMBB), and/or massive Machine-Type Communication (mMTC). In such a way, service providers can fulfill the expected QoS while raising their revenue and reducing costs.

Embodiments of the invention select nodes to run VNF instances for one or more SFC instances in a manner that meets the needs/requirements of multiple applications/users. In one example, an NFV Orchestrator (NFVO), which is an example of a placement engine, is responsible for placing or the placement of VNFs in the NFVI system, which should be accomplished in such a way that the QoS requirements of the applications are met, while trying to increase the revenue of service providers by optimizing their resource usage.

A host can execute multiple VNF Instances, and a single VNF Instance can be shared among multiple applications and/or users. A VNF may also have a type, which may relate to the function performed. Examples of VNF types include, but are not limited to, virtualized routers, firewalls, WAN optimization, network address translation (NAT) services, or the like or combination thereof. As previously indicated, a VNF instance is an instance of a VNF type running on a host or, more specifically, in a virtual machine operating on the host.

When placing VNFs or when generating a VNF placement plan, embodiments of the invention select hosts that allow SFC packets to traverse the VNF instances to meet user demands without violating SLA requirements. In one example, the SLA may refer to the maximum end-to-end packet delay. Other SLA metrics may be used alone or in combination. Embodiments of the invention may also consider energy requirements/consumption when selecting the hosts. Selecting hosts for VNFs that are energy efficient can reduce infrastructure costs and increase revenue for service providers. Energy can also be conserved by selecting a host that is already running a needed VNF instance.

In example embodiments, users accessing the system (e.g., a NFVI system or infrastructure) may have heterogeneous connectivity resources in terms of network latency and bandwidth. The hosts of the system may have heterogeneous capacities in terms of CPU, memory, latency, and bandwidth. In addition, each host may have a different subset of VNFs that users can request or that the host can support.

Each request from a user (i.e., the user's device) may have a set of requirements. Some requirements are intrinsically related to the VNFs, such as the minimum amount of CPU required, while others are specific to the request, for example, the maximum tolerable delay.

Embodiments of the invention relate to placing VNFs in a manner that accounts for, by way of example, two aspects of dynamism. First, requests arrive at the system over time and the arrival rate of the requests is not typically known in advance. Second, the end user (or client device) may be moving while accessing the system and the resources. This may require the existing SFC to be replaced with a different or new SFC, which may involve VNFs on different hosts. In other words, user mobility and service degradation may result in a replacement operation, which replaces an existing SFC instance with a new SFC instance.

Embodiments of the invention process SFC requests using time windows. All requests received during a particular time window are placed collectively. Using a time window addresses the arrival rate of user requests and user mobility. For example, placement decisions for all requests received during a specific time window may be performed at the end of that time window. This allows multiple requests to be handled or placed in the infrastructure at the same time and also allows the system to adapt to changes in user locations. Thus, one of the requests may be a replacement request to replace an existing SFC instance.

Networks may be expected to support various service classes that have different requirements. For example, the eMBB class requires high bandwidth, the URLLC class requires reliable packet delivery under stringent delays, while the mMTC class requires sufficient processing and network capabilities to meet the requirements of thousands of devices.

Each SFC corresponds to a particular service that can be categorized under these broader and highly heterogeneous classes. Therefore, SFCs also have distinct requirements, which are specified in their SLAs. In fact, even SFCs belonging to the same classes may have specific requirements, depending on, for example, which user/client requested the service. Additionally, VNFs that compose an SFC may require different CPU and/or memory capacities according to their respective functions in the chain.

As a result, embodiments of the invention generate VNF placements in a system that address the multiple and sometimes conflicting requirements and priorities of SFCs. These priorities may be related to latency, capacity, and energy consumption. If an SFC prioritizes latency, the placement engine should select nodes that better satisfy the VNF requirements regarding the VNF processing delay. These different priorities further increase the heterogeneity of SFCs.

Embodiments of the invention also account for the inherent dynamism of SFC requests that arrive overtime. Embodiments of the invention place VNFs to account for multiple requests from multiple users while performing placement operations in an environment in which other VNFs are already placed and running. This allows the placement engine to place VNFs that are already running or instantiate new VNF instances.

In an edge system, there are hosts with heterogeneous computational resources. Different types of VNFs can be instantiated. VNFs also deal with a variety of link bandwidth capacity among the related hosts. The link bandwidth is a resource to be provided to SFCs because SFCs include a set of chained VNFs, which must be processed or executed in a predefined order. The computational resources of edge hosts must be capable of meeting requirements of the VNF instances, and the link bandwidth among the hosts must be able to forward traffic through all of the chained VNF instances as required.

As previously stated, edge hosts have heterogeneous capacities in terms of CPU, memory, latency, and bandwidth. Edge hosts also vary in their computational capacity as new VNF instances are hosted and as VNF instances are removed. The link bandwidth varies as well in response to adding/replacing/removing VNF instances on the hosts of the system. The heterogeneity and dynamism of the computational resources of edge hosts and links makes placing VNFs a complex task. In addition, users/clients accessing the system also have heterogeneous resources in terms of network latency and bandwidth in their links to the edge node that communicates with the user (or with the user's device or client).

The placement engine may generate a placement plan that satisfies the initial SLA based on the static requirements of the defined VNFs and the SFCs. The placement engine will find hosts (or a host) with enough CPU and memory resources to run the VNF instances (or instance) and find links with sufficient bandwidth between the selected hosts that are selected to run the VNFs.

Nonetheless, after the placement plan is executed and the users start executing the application, the placement plan may fail to satisfy SLA requirements due to changes in the environment and demands that cannot be anticipated during the SFC configuration phase, such as user mobility. In some environments, such as 5G environments, users can move from one location to another while running applications from their devices. Eventually, these movements might change the network paths from the user to the associated Radio Access Network (RAN).

Considering an already placed SFC request (or the SFC instance), the mobility of a user may incur greater delays due to the changes in the characteristics of the path that connects the user to the existing SFC instance, which might affect services. In fact, another set of VNFs (e.g., on different nodes) may be more suitable for the current user location. Therefore, depending on user mobility and/or performance deterioration metrics, the replacement of an existing SFC instance might be necessary to maintain service performance when the SLA starts to deteriorate due to user mobility or for other reasons.

Thus, the placement engine may be combined with or include an architecture that identifies or detects user movements when they change between RAN nodes, identifies whether user mobility deteriorates the service performance, and executes the VNF placement again when necessary.

Embodiments of the invention perform VNF/SFC placement while reducing/minimizing SFC latency (e.g., transmission, propagation, processing, queueing), infrastructure cost (e.g., computational, communication), and/or energy consumption in edge nodes.

FIG. 1 discloses aspects of example parameters used in performing placement operations, including VNF/SFC placement operations in an infrastructure such as an edge infrastructure. The parameters are defined as follows and are illustrated in the table 100.

Undirected graph G=(H,L);
Set of nodes H={$h_1, h_2, \ldots, h_n$}. This set of nodes represents hosts that host virtual machines where VNFs may be instantiated and execute. Each node h has the following attributes:
  Total resources are represented by $R_h$ {$c_h, m_h$}, where $c_h$ defines a CPU capacity of host h and $m_h$ defines the memory capacity of host h;
  Available resources $RA_h$ {$ca_h, ma_h$}, where $ca_h$ defines the available CPU resources in the host h and $ma_h$ defines the available memory in the host h; and
  Each host h includes a list of VNF images $IM_h$={$vi_1, vi_2, \ldots, vi_n$} that can be instantiated at the host h (node), with $vi_n \in VI$;
A set of links (including virtual links) L={$l_1, l_2, \ldots, l_n$} that denotes the set of links among the edge hosts and, for every $l \in L$ between two adjacent hosts $h_1$ and $h_2$ in H:
  Bandwidth capacity is denoted as $b_{h_1 h_2}$;
  Delay is represented as $d_{h_1 h_2}$; and
  Loss rate of the link is represented as $w_{h_1 h_2}$; and
The set U={$u_1, u_2, \ldots, u_n$} is the set of users that make SFC requests.

The table 100 also includes information related to VNFs and SFCs. As previously stated, VNFs may provide network functions, such as firewall and proxy functions, and/or high-level services such as image processing caching, video streaming, and the like. In the table 100, F=$F_n \cup F_h$, wherein $F_n$ represents VNFs that perform network functions and $F_h$ represents or denotes VNFs that contain high-level services. A VNF $f \in F$ demands a minimal number of computational resources defined as D(f)={$D_c(f), D_m(f)$}, where $D_c(f)$ is the CPU demand and $D_m(f)$ is the memory demand. For each VNF, a dependence is defined Dep(f)={$Der_r(f), Dep_{ex}(f)$}, where $Der_r(f)$ denotes the vector of resources that a VNF depends on (e.g., network interfaces) and $Der_{ex}(f)$ represents the vector of external data that a VNF requires to be deployed.

During a placement operation, a graph may be generated that includes the information identified in the table 100. The nodes and edges of the graph may store this information. This information allows a placement engine to generate a placement plan that identifies specific hosts to implement the request and that identifies which VNFs run on which of the selected hosts. Executing the placement plan includes deploying the SFC instance, which includes configuring (if not already present) the required VNF instances on the selected hosts.

FIG. 2 discloses aspects of a placement engine configured to perform placement operations and an infrastructure in which the placement engine may operate. FIG. 2 illustrates a system 210 (e.g., a network function virtualization infrastructure). The system 210 may include hosts 214 that may each be associated with hardware (e.g., processors, memory, networking hardware). Virtual machines (or containers) may run on one each of the hosts 214. Each of the virtual machines on each of the hosts may be able to support or execute multiple VNFs. One or more links may exist between each pair of hosts in the hosts 214.

The placement engine 212 may operate in the system 210 and may operate on one of the hosts 214. In another example, instances of the placement engine 212 may operate on one or more of the hosts 214. In one example, the placement engine 212 operates or is accessible by the specific host that interfaces with a user (or a user's device). Alternatively, the host connected to a user may access the placement engine 212 to generate and execute a placement plan.

The placement engine 212 is configured to receive requests 216 from multiple clients, represented by clients 202 and 204. In this example, the clients 202 and 204 represent devices that may be running an application or that require SFC/VNF resources. The clients 202 and 204 may be representative of end user devices, such as laptops, tablets, smart phones, sensors, or other devices. The clients 202 and 204 may also represent servers.

The requests, 216, in one example, may be SFC requests, which are requests for services that may include network services, functions, or applications. An SFC request may be a request to process packets in an ordered VNF chain defined by the SFC. When placing an SFC request, the placement engine 212 may instantiate a chain of VNFs in the hosts 214. The chain of VNF instances constitute the SFC instance. The VNFs are arranged such that traffic flows through the connected VNFs in a determined order. When VNFs are implemented in virtual machines, the various components or instances have open connectivity. The VNFs can communicate using, for example, uniform resource locators (URLs). This allows multiple links between the same pair of hosts.

When a request 216 is received, the placement engine 212 evaluates the hosts 214, for example, using the parameters set forth in the table 100, and places VNF instances on one or more of the nodes 214. More specifically, the placement engine 212 may generate a graph that is used to generate the placement plan. By considering these parameters, which are stored in the graph, the placement engine 212 can develop a placement plan. The placement plan may identify specific hosts and identifies which VNFs identified in the request operate on which of the specific nodes. This also defines the path of the packets in the system 210. The VNFs can then be deployed as VNF instances and the application or request may be executed. Packets associated with fulfilling or performing the requests 216 are then routed over and processed by the VNFs instantiated on these hosts 214 in the determined order.

For example, the request may require a certain latency. In this case, the bandwidth, transmission delay, and/or loss rate of the links/nodes may be evaluated to find links that satisfy the latency requirement. In another example, a particular VNF may require a certain amount of memory and/or certain processor requirements. The hosts 214 can be evaluated until hosts with the requisite memory/processor capacities are identified. Identifying and selecting hosts to host VNF instances may also consider existing VNF instances. Using existing VNF instances, for example, may allow energy requirements to be satisfied.

The process of generating a placement plan may require considering each host and each link individually. The process of generating a placement plan may also require considering a chain of hosts collectively. Once an appropriate set of hosts is identified for hosting the VNFs, the VNFs can be deployed or used to service the request.

In one example, the placement engine 212 does not do an exhaustive analysis to determine all possible host combinations that will satisfy the request. Rather, embodiments of the invention may select hosts that satisfy the request when adequate hosts are identified. Thus, the hosts selected for an SFC may not be an optimal set of hosts and the set of VNF instances instantiated on those hosts may not be the optimal set of VNF instances.

More specifically, the system 210 may be an edge system that services SFC requests 216 in order to reduce/minimize the total packet delay from a user or client request until its response, the energy consumption and computational resources required to run the instantiated VNFs, and/or the total cost of computation and communication resources required to run the VNFs while accounting for the dynamic aspects of executing (e.g., changing resources) and the mobility of users.

In one example, the total packet delay is computed from the instant that the packet enters in the first VNF instance to the instant the packet leaves the last VNF instance of the SFC instance, although other metrics may be used. In one example, each user or client is associated with one host in the system 210 (or edge environment). In one example, each VNF instance can handle a maximum number of requests without consuming more host resources than those already allocated. If the limit of requests is violated, there may be a penalty associated with that request, such as an increase in the process time. Thus, the clients 202 and 204 may communicate with the same host or with different hosts in the system 210.

The placement engine 212 generates and executes placement plans that meet relevant requirements (e.g., SFC SLA requirements, VNF requirements). When evaluating the hosts 214, the placement engine 212 may consider, in addition to the parameters, one or more of the latency, capacity, and energy to select the hosts on which to place the VNF instances derived from the requests 216. The input to the placement engine 212 may include SFC requests 216. The SFC requests 216 may identify different VNF types requested by users according to a specified arrival process. More specifically, the requests 216 may specify VNF types, VNF/host priorities, or the like. The placement engine outputs 212 a placement plan for each request, which maps VNF types to hosts for each request. The VNFs are then instantiated as VNF instances. The VNF instances, from the perspective of a current SFC request or a current placement plan, may be new VNF instances, existing and placed VNF instances, or combination thereof.

Figure 3:
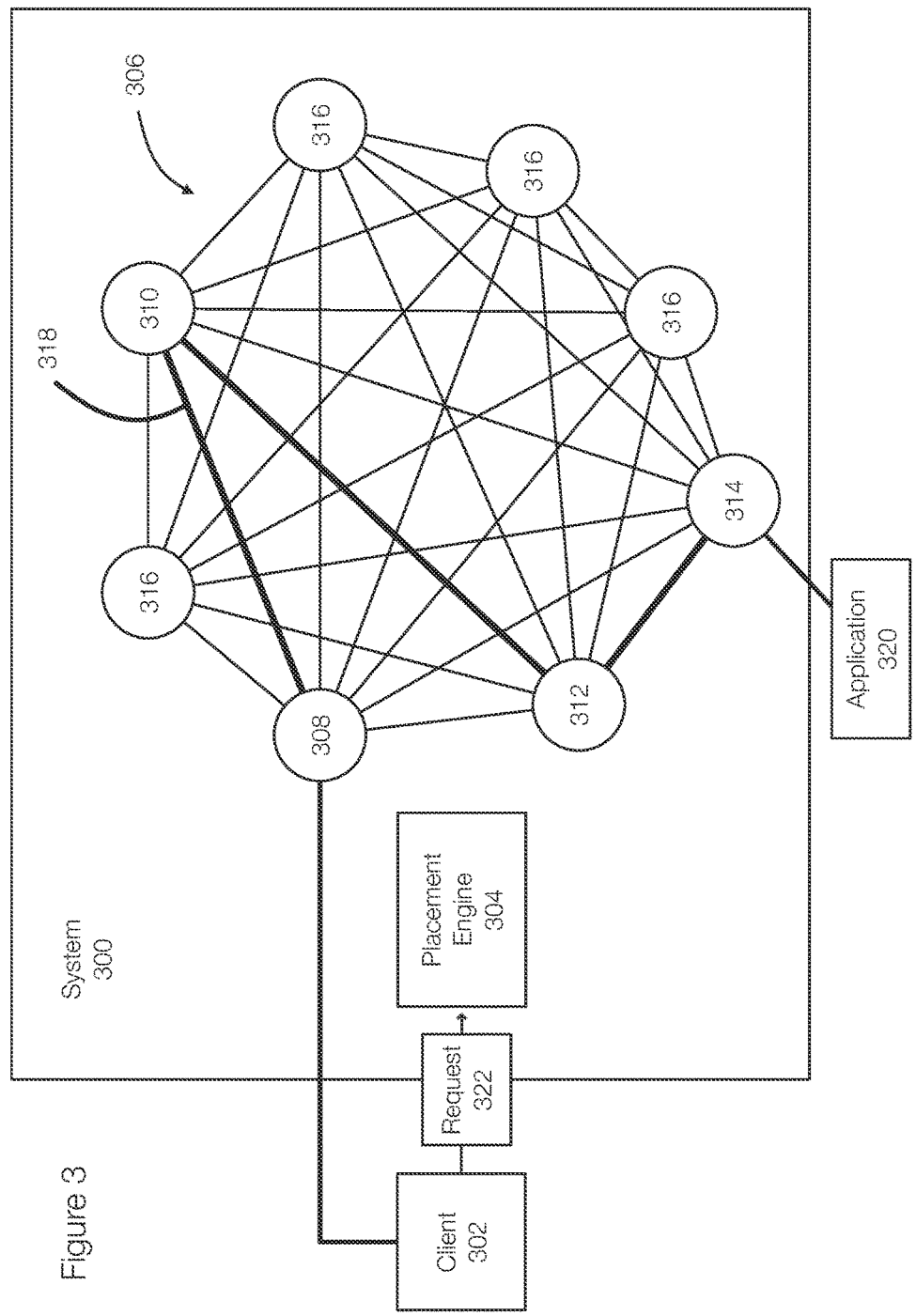
FIG. 3 discloses aspects of preparing and/or executing a request.

FIG. 3 discloses aspects of preparing and/or executing a placement plan in response to receiving a request from a client. FIG. 3 illustrates both a representation of the hosts of the system 300 as nodes in a graph and is also used to illustrate physical hosts that may be part of a placement plan. In other words, each node of the graph 306 represents a host of the infrastructure.

FIG. 3 illustrates a placement engine 304 associated with a system 300 that receives a request 322 from a client 302. The system 300 includes hosts, represented by the nodes 308, 310, 312, 314, and 316 in the graph 306. The graph 306, for each of the nodes represented therein, may include dynamic information (e.g., link usage, CPU usage, network topology, memory usage or other parameters) and may be generated or updated for each request (or group of requests). Thus, the nodes of the graph 306 may represent the edge nodes and the edges of the graph 306 may represent links between the edge nodes.

Although FIG. 3 illustrates a single link between each of the nodes in the graph 306, more than one link may exist between each pair of nodes. In one example, the links include virtual links. Because the links may have different characteristics, links can be selected based on different metrics. When more than one link is available, a link that fulfills the requirements of the SFC instance is selected.

The graph 306 includes nodes 308, 310, 312, 314, and 316. In this example, the client 302 is connected to the node 308. Links are illustrated as lines between the nodes 306. When a request is 302 is received by the placement engine 304, the placement engine 304 may generate a placement plan. The placement plan accounts for each of the VNF types identified in the request 322. In this example, the placement plan generated by the placement engine 304 includes the hosts associated with the nodes, the nodes 308, 310, 312, and 314. The VNFs identified in the request 312 can be instantiated at these hosts.

In accordance with the placement plan, VNF types are instantiated at the hosts corresponding to the nodes 308, 310, 312, and 314 of the graph 306. This allows packets to be processed in a specific order. In this example, the node 308 is an ingress node and the node 314 is an egress node. The placement engine 304 finds the path 318 (in bold) that passes through the hosts needed to execute the VNFs in the request 322. Thus, packets from the client 302 to an application 320 pass through the hosts identified by the placement plan. In one example, the node 314 may represent a higher-level application. Thus, the egress node 314 may be a termination or application node. The application 320 may operate on a node in the system 300 or at another location or network. The return path from the egress node 314 or from the application 320 may be the reverse of the entry path or may be a different path.

In addition to the parameters in the table 100 that may be stored in the graph 306, the selection of nodes may account for what VNFs are available at a particular node, which nodes support which VNFs, and/or other considerations. This type of information may be included in the graph 306. Using the graph 306, the placement engine 304 can generate a placement plan that satisfies requirements associated with the request.

The placement plan generated by the placement engine 304 may include multiple placement plans—one for each of multiple requests received during a particular time window. When generating a placement plan, the placement engine 304 may start with the ingress node 308. Assuming that a first VNF is mapped to the node 308, the placement engine may then select the next node of the placement plan based on the next VNF in the chain of VNFs. In this case, this leads to the selection of the node 310 and a specific link between the node 308 and the node 310. This selection may be based on the parameters of the table 100, energy requirements, SLA requirements, latency requirements, or the like or combination thereof.

In one example a provider of the system 300 may offer different types of services at different priority levels. Different users may have different priorities. Thus, SFC requests from users with high priorities may be prioritized. In one example, the resources of the system 300 may not be sufficient to service all of the requests. In this case, some requests may be refused (at least temporarily) or existing low priority requests may be terminated or destroyed and then replaced. This ensures that resources are available for higher priority requests or that resources can be released for higher priority requests. When generating a placement plan that places VNFs for multiple requests, requests may be grouped by priorities for example or for other reasons.

Figure 4:
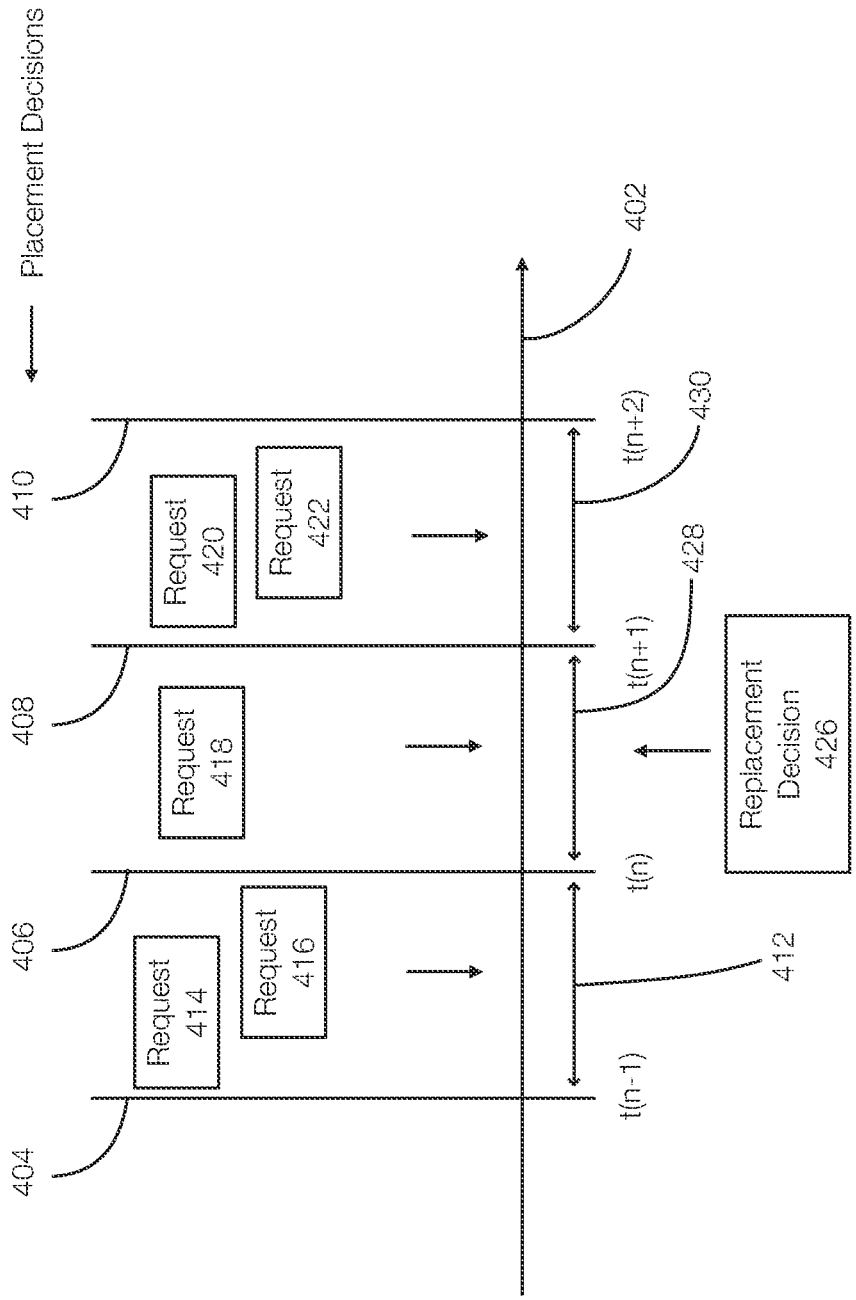
FIG. 4 discloses aspects of time windows in which requests are received.

FIG. 4 discloses aspects of time windows for servicing user requests. FIG. 4 illustrates time windows such as the time window 412. The time window 412 of the timeline 402 exists between time $t_{n-1}$ and $t_n$. Similar time windows 428 and 430 are present and defined, respectively, by times $t_n$ to $t_{n+1}$ and by times $t_{n+1}$ to $t_{n+2}$.

FIG. 4 illustrates that multiple requests are considered at the same time. Thus, if requests 4141 and 416 are received in the time window 412, a placement decision 406 is made for all requests received in the time window. Thus, placement decisions 404, 406, 408, and 410 are made for all requests received during the preceding time window. More specifically, the requests 414 and 416 are placed at time $t_n$, the request 418 is placed at time $t_{n+1}$, and the requests 420 and 422 are placed at time $t_{n+2}$. The placement engine may generate a placement plan for each of the requests in the time window 412 at the placement decision 406.

The size of the time windows 412, 428, and 430 can be adjusted and/or parameterized. This allows the placement engine to deal with the dynamic nature of SFC requests and enables an online placement. Even if the size of the time windows is initially fixed, the sizes can be adjusted according to network environment characteristics. This may prevent SFC placement starvation and prevent the execution of placement in small time windows, which may tax resources.

In addition, each of the time windows may relate to requests from users in the same neighborhood (e.g., connected to the same RAN). Grouping requests allows the placement engine to work on SFCs with similar network access. Thus, time windows may be generated for different access points or the like. This allows an infrastructure flexibility in handling the dynamic aspect of incoming requests.

The placement engine may operate in an online mode and/or an offline mode. Offline decisions may gather information and make placement decisions based on the gathered information. However, the placement is static throughout system execution. In online placement operations, data is collected periodically to monitor the current load of the system. This allows decisions such as VNF replacement, VNF scaling, and/or VNF destruction to be performed. In one example, the online aspect is illustrated by regenerating the graph 306 from time to time (e.g., for each time window).

In addition to online considerations (e.g., CPU usage/availability, memory usage/availability, bandwidth usage/availability), embodiments of the invention account for user mobility. If the performance of an SFC instance deteriorates or does not meet relevant requirements, a replacement decision 426 may be performed. The replacement decision 426 may be considered along with other requests received during the same time window. Alternatively, replacement requests may be handled in an ad hoc manner because they may represent SFC/VNF instances that are not meeting requirements.

Figure 5A:
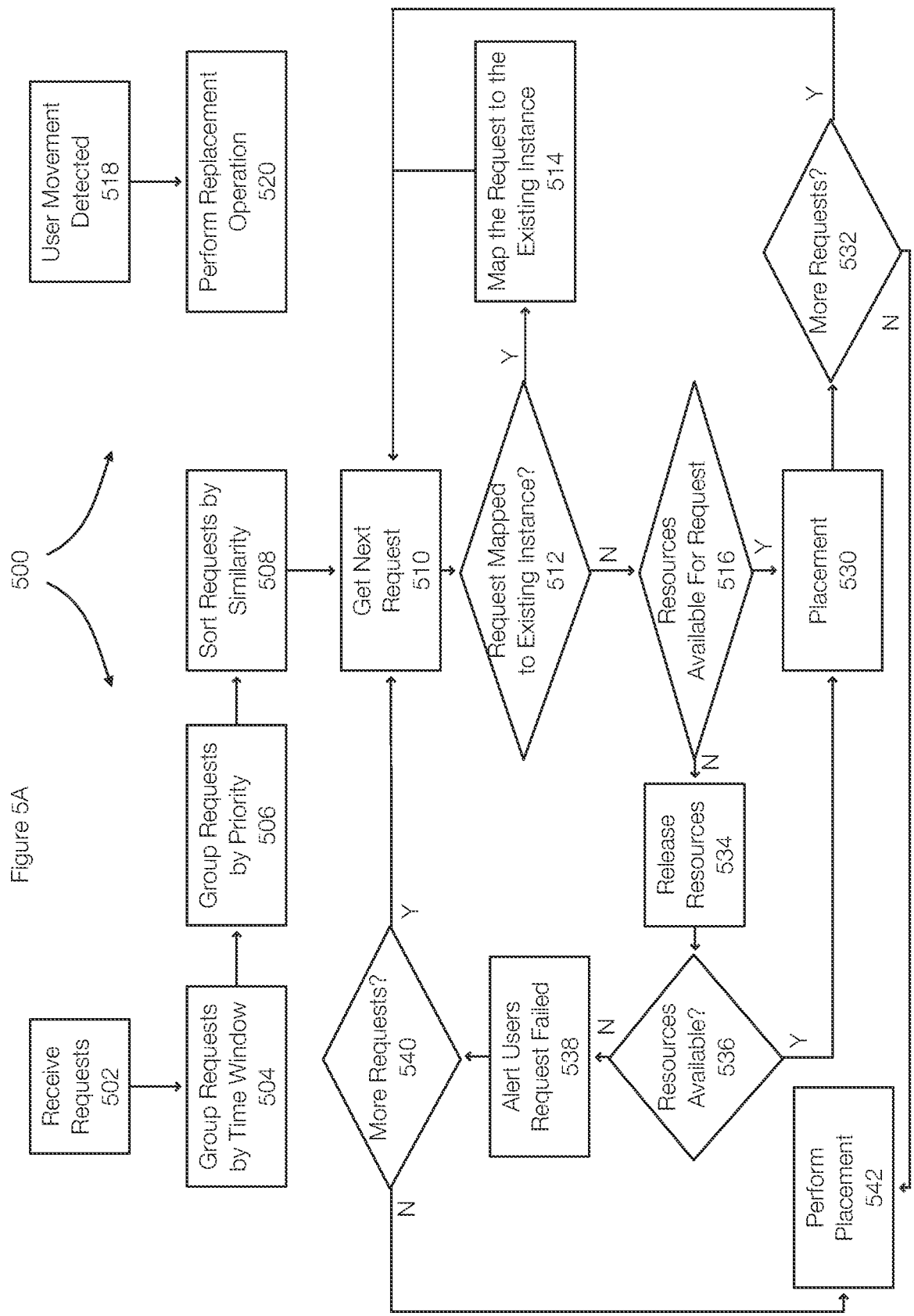
FIG. 5A illustrates aspects of generating and executing placement plans in an infrastructure.
Figure 5B:
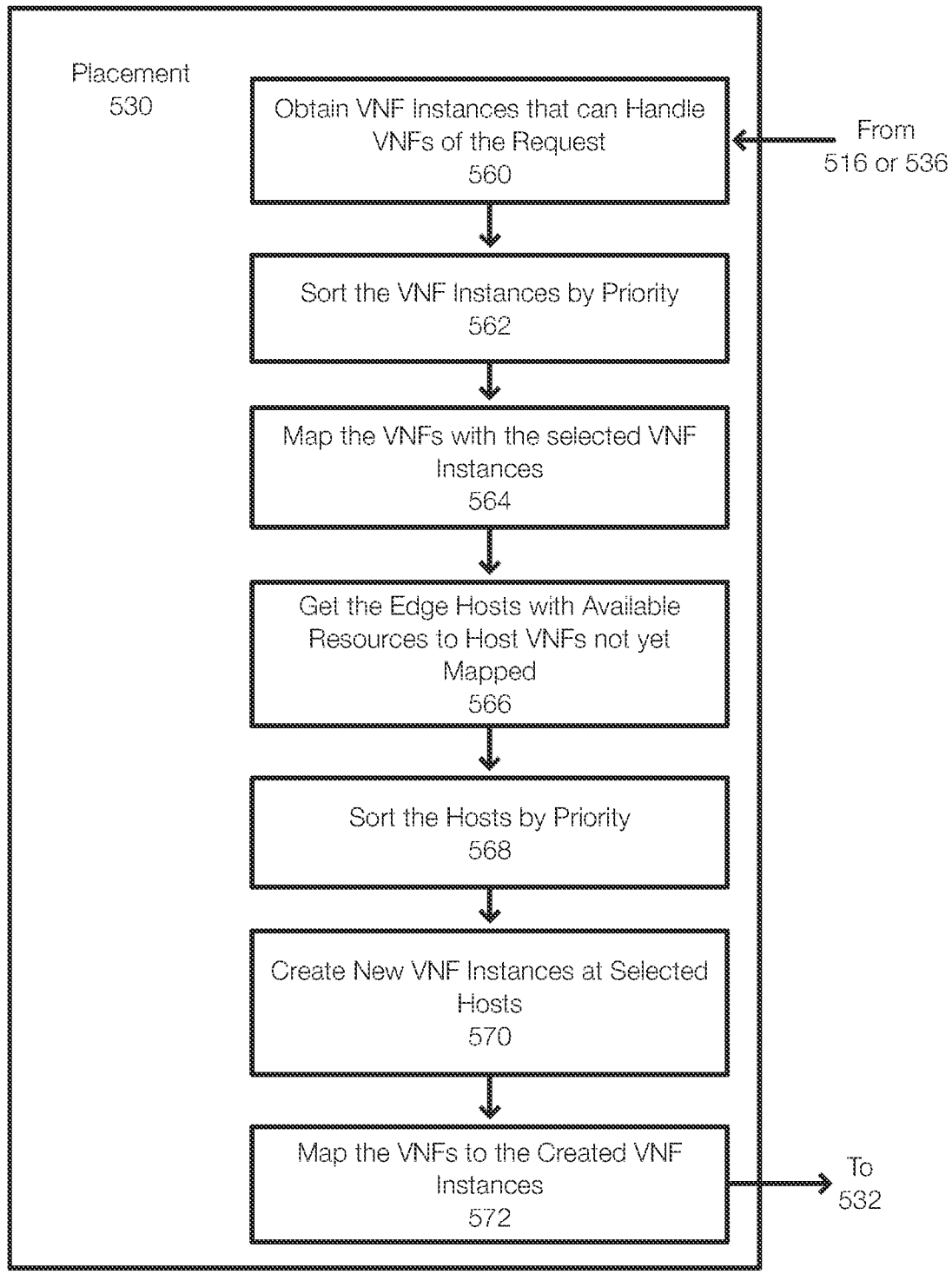
FIG. 5B illustrates additional aspects of generating and executing placement plans in an infrastructure.

FIGS. 5A and 5B disclose aspects of generating and executing placement plans in an infrastructure. The method 500 illustrates aspects of a placement operation. The elements of the method 500 may be performed at different times. Some elements may be skipped or not performed in some examples.

In FIG. 5A, requests are received 502, for example at a placement engine. The requests 502 may be grouped 504 by time window. Next, the requests for a specific time window may be grouped 506 by priority and/or sorted 508 by similarity (e.g., similar network access). This allows the placement engine to ensure that higher priority requests are placed and ensure that similar requests are placed based on the similarity.

Once the requests for a time window have been prioritized and/or sorted, the requests are processed. The next (or first) request is retrieved 510 and processed. Processing a request is an example of generating a placement plan for the request. Once all placement plans have been generated, the placement plans can be executed in the infrastructure.

Initially, the method 500 determines 512 whether the requests can be mapped to an existing SFC instance that satisfies the criteria of the request. If so (Y at 512), the request is mapped to the existing SFC instance 514. Thus, each of the VNFs in the request are mapped to VNF instance operating on hosts associated with the existing SFC instance.

If the request cannot be mapped to an existing SFC instance (N at 512), the method 500 determines if resources for the request are available for the request. If resources at the nodes are available (Y at 516), then the request undergoes placement 530 (see FIG. 5B). When placement 530 is completed, and no more requests for the time window need to be processed (N at 532), the placement is performed 542 for the placement plans generated for the requests in the time window. Otherwise, the next request is processed (Y at 532).

If resources are not available (N at 516), resources are released 534 where possible. For example, lower priority SFC instances that have been placed may be destroyed to free resources in the infrastructure. SFC instances that are destroyed may be replaced when possible. If resources are available (Y at 536), placement 530 is performed. If resources are not available (N at 536), a user may be alerted that the request has failed 538 and the next request is processed (Y at 540). If no more requests are present (N at 540), placement is performed 542.

FIG. 5B discloses aspects of placement 530 in FIG. 5A. FIG. 5B thus illustrates aspects of selecting hosts for the request based on relevant requirements/resources. When generating the placement plan for a request, (placement 530), placement 530 determines whether VNFs instances that can handle VNFs of the request are identified or obtained 560. In other words, placement 530 determines whether existing VNF instances can be used for any of the VNFs in the request. The VNFs may be sorted by priority 562 defined in the request. This may allow existing VNF instances to be selected for the request.

The VNFs that can be handled by existing VNF instances are then mapped 564 to the existing VNF instances that have been selected. This illustrates that existing VNF instances can be used for multiple SFC requests.

For VNFs of requests that are not mapped (e.g., not mapped to existing VNF instances), edge hosts with available resources to host VNF instances are identified 566. These hosts may also be sorted 568 by priority. Next, new VNF instances for the unmapped VNFs are created or instantiated 570 at the selected hosts. The VNFs are mapped to the VNF instances that have been created 572.

As previously stated, the placement 530 may consider the graph 306 and the information represented by or stored in the nodes and edges of the graph such that nodes on which to instantiate VNF instances can be selected to satisfy requirements such as CPU requirements, memory requirements, QoS requirements, cost requirements, energy requirement, resource requirements, or the like.

The placement 530 generates a placement plan that maps the VNFs of the requests being placed to virtual machines (or hosts in the infrastructure). Once the placement plans have been generated, after all relevant requests have been processed, the placement plans are executed. After execution, SFC instances exist for each of the processed requests in the time window.

The placement engine is responsible for processing each user request. In processing the requests, the priorities of the SFCs may be considered. In addition, each of the SFCs may be required with other requirements such as reducing energy consumption, reducing CPU, RAM and storage consumption in the edge nodes, and reducing latency.

For each VNF of an SFC, a few possibilities are available during the placement operation. First, the method 500 may determine that one or more VNF instances that are capable of handling a particular VNF of the SFC request are running. If only one suitable VNF instance is available, that VNF may be mapped to that VNF instance. If multiple VNF instances are running, a mapping is created from the VNF to a VNF instance that meets the criteria associated with the SFC. If a VNF instance is not available or running, a VNF instance is created and run on a host that satisfies the criteria of the SFC.

Figure 6:
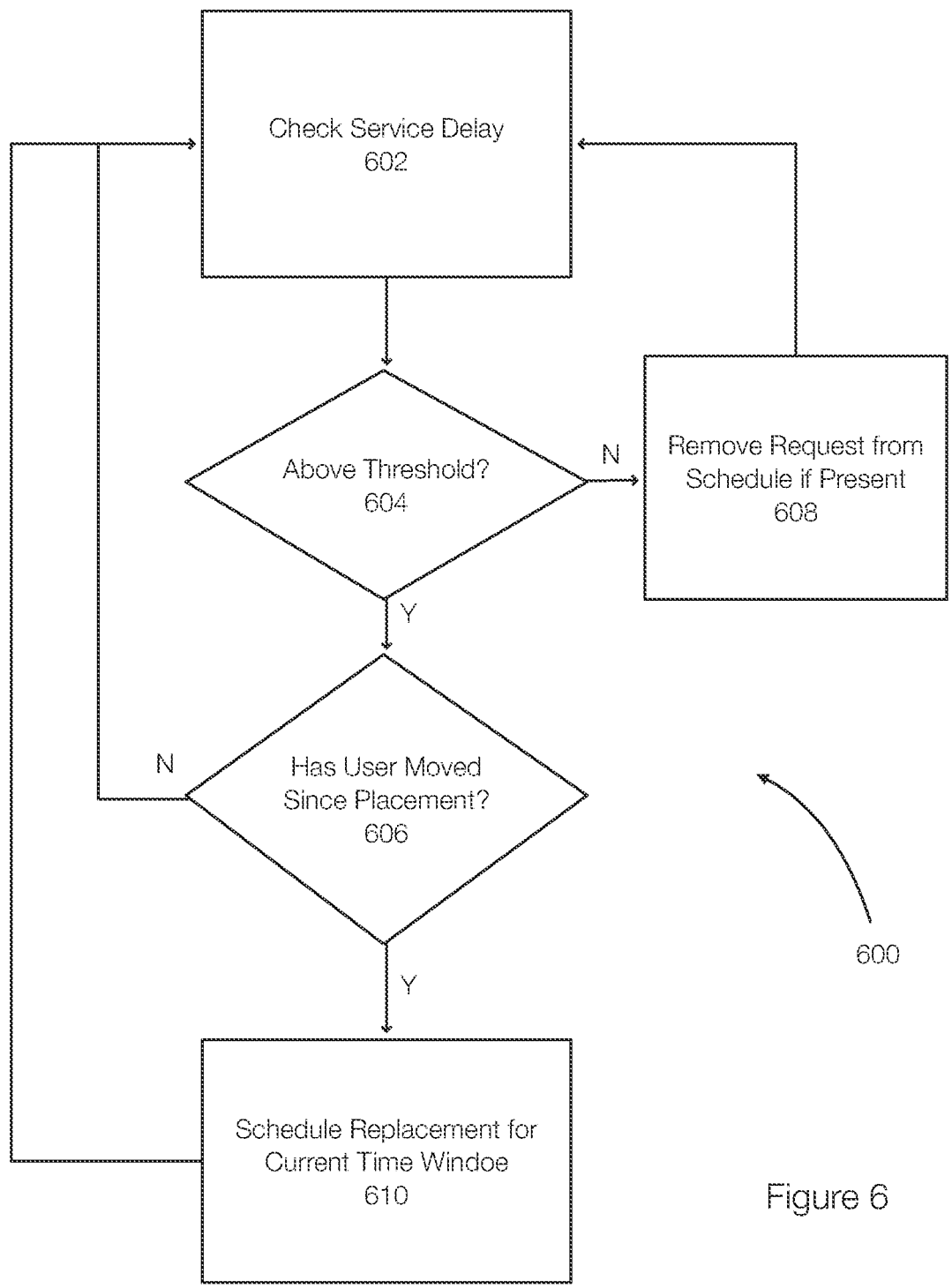
FIG. 6 discloses aspects of a placement operation related to user mobility.

In some examples, users may move within an environment (e.g., a 5G environment). As a result, their services (e.g., the performance of the SFC instance) may begin to deteriorate (e.g., longer latency). To account for mobility, user mobility FIG. 6 discloses aspects of a placement operation related to user mobility.

In the method 600, the service is checked 602 for delay (or other performance metric). If the metric is delay, then a delay above a threshold delay is not acceptable and the SFC instance (or one or more VNFs) should be changed (e.g., by generating a new placement plan).

If the metric is below the threshold (N at 604), a replacement request is removed 608 from the schedule (the requests for a current time window) if present therein. If the delay (or other metric) is above (or below depending on the metric) a threshold (Y at 604), the placement engine or other process may determine 606 whether the user has moved since the request was placed.

If the user has moved (Y at 606) the SFC is scheduled for replacement 610 in a current time window. This is illustrated as a replacement decision 426 in FIG. 4. The method 600 then returns to checking for service delay or to checking other metrics that may warrant SFC replacement when above a threshold. The replacement performed at 610 may simply destroy the old SFC instance and create a new SFC instance as described herein. However, SFC instances are not destroyed until all packets traversing the SFC instance have completed.

Figure 7:
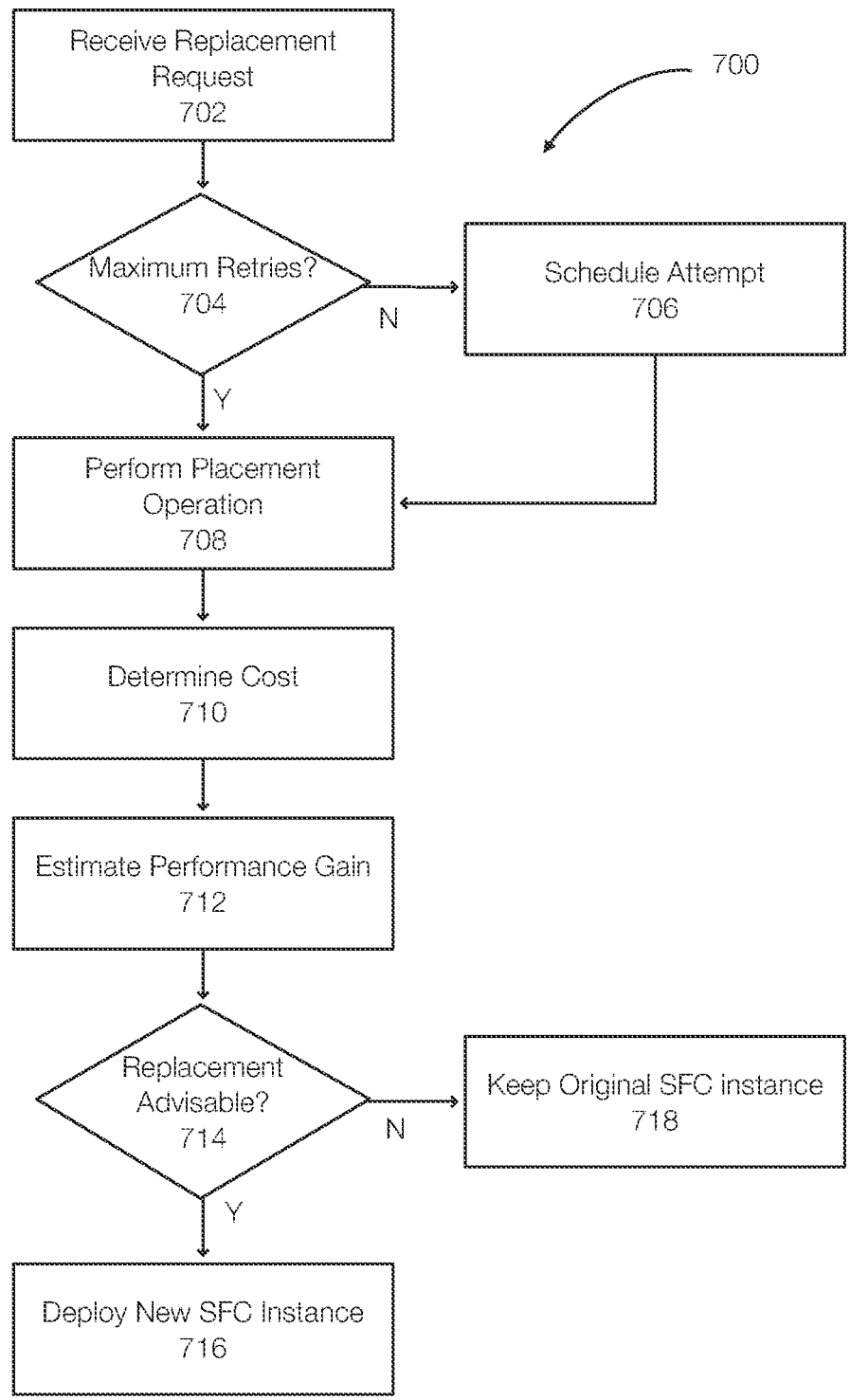
FIG. 7 discloses aspects of replacing an existing SFC instance with a new SFC instance.

FIG. 7 discloses aspects of replacing an existing SFC instance with a new SFC instance. Replacing an SFC instance may have more urgency compared to placing new requests at least because the existing SFC instance may not be meeting QoS or SLA requirements or for other reasons. The method 700 discloses aspects of a replacement operation where an existing SFC instance is modified or replaced.

The method 700 is generally invoked when service degradation and/or user movement is detected. When replacing an SFC instance, the replacement operation may fail because resources are unavailable. The replacement operation may be cancelled when the cost is excessive or when the performance gains are insufficient. Further, a better placement plan may not be available. These conditions, among others, may result in the replacement operation being postponed, cancelled, or retried at a later time.

Generally, a replacement request is received 702 in the method 700. Stated differently, the system may determine that service has degraded (e.g., latency is above a threshold) or that the user has changed locations (e.g., in a different location, using a different RAN). This may trigger the replacement request. If the maximum number of retries has not been performed (N at 704), an attempt to replace the SFC instance is attempted 706.

The replacement operation is similar to the placement operation described herein. Thus, the placement operation is performed 708 to obtain a placement plan. If the maximum number of retries has been performed (Y at 704), the most recent placement plan is executed by the placement operation 708.

If a retry is allowed and the placement plan is generated, the cost of the placement plan is determined 710. The performance gains of the new placement plan are also estimated 712. If replacement is advisable (Y at 714) based on, for example, the cost and/or the performance gains, the placement plan is executed and a new SFC instance is deployed 716. If replacement is not advisable (N at 714) based on the cost and/or the estimated performance gains, the original or existing SFC instance is retained 718.

In one example, the method 700 is not performed at the end of a time window. Rather, the replacement operation is performed when the performance degradation reaches a specified threshold. This allows underperforming SFC instances to be replaced as soon as failure (e.g., insufficient performance) is detected.

Embodiments of the invention, when performing placement operations (e.g., generating and/or executing placement plans), allow VNF instances to be shared, which results in improved resource utilization. Embodiments of the invention place VNFs in a heterogeneous edge environment where the available resources change over time. To improve/optimize resource utilization, embodiments of the invention not only allow the resource sharing among the VNF Instances, but also enable sharing SFC instances. This additional level of sharing allows multiple requests to be handled by the same SFC instance, which also improves the shared used of VNF instances.

When sharing SFC instances, a new or arriving request may have the same SFC type and the same ingress and egress nodes as an existing SFC instance. This improves/optimizes the use of nodes by concentrating several requests in the same node and, consequently, saves the energy that would be otherwise be used on other nodes.

Embodiments of the invention may also be used in the context of various scenarios such as ultra-reliable and low latency communication (URLLC), enhanced Mobile Broadband (eMBB), and massive Machine-Type Communication (mMTC). Embodiments of the invention intend to meet the respective QoS requirements while decreasing the cost for the infrastructure provider. Embodiments of the invention are aware of latency, computational resource capacity, and energy consumption, user mobility, and/or the continuous arrival of requests. Embodiments of the invention select edge nodes that fit the characteristics for placing these requests. Further, each request may include a list defining the priority order considering latency, computational capacity, and energy consumption. For instance, if an SFC prioritizes the energy consumption, then the placement operation searches for nodes that consume less energy among all nodes.

A replacement operation, which is substantially the same as a placement operation, is configured to find a suitable VNF chain considering the new location of the user, reducing the impact introduced by the user's mobility. When the replacement finds or generates a new VNF chain for the ongoing service, packets that are currently traversing the old VNF chain will continue to be processed until they arrive at the destination, while packets that arrive after the replacement will be processed by the new chain of VNF instances. The old VNF chain remains active until all packets traversing the chain are processed. If a new VNF chain is not available, for example due to the scarcity of node and link resources at the moment of that the replacement is triggered, the replacement is rescheduled, limited by a maximum number of attempts, waiting for resources to become available in the next replacement attempt. The waiting time until the next replacement attempt may increase on an exponential basis.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, placement operations, instantiation operations, replacement operations, deployment operations, plan generation operations, performance monitoring operations, or the like or combination thereof. More generally, the scope of the invention embraces any operating environment in which the disclosed concepts may be useful.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment and/or edge environments, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers or VMs, or any combination of these, though no particular device implementation or configuration is required for any embodiment.

Example embodiments of the invention are applicable to any system capable of storing and handling various types of objects, in analog, digital, or other form It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving requests during a time window from clients, wherein each of the requests is associated with a chain of virtual network functions (VNFs), wherein the virtual network functions are executed in an infrastructure that includes hosts, performing a placement operation to generate a placement plan for placing VNFs associated with the requests in the hosts of the infrastructure, wherein the placement plan, wherein the placement operation includes, mapping the VNFs of the requests to existing VNF instances operating on the hosts; and for VNFs that are not mapped to existing VNF instances, selecting hosts that satisfy the requests and creating new VNF instances on the selected hosts, and executing the placement plan to place the VNFs of the requests in the hosts.

Embodiment 2. The method of embodiment 1, further comprising grouping the requests by priority and grouping the requests by the time window.

Embodiment 3. The method of embodiment 1 and/or 2, wherein each of the requests is instantiated as an SFC instance, wherein each of the SFC instances includes a corresponding chain of VNFs.

Embodiment 4. The method of embodiment 1, 2, and/or 3, wherein some of VNF instances are shared by multiple clients.

Embodiment 5. The method of embodiment 1, 2, 3, and/or 4, wherein some of the SFC instances are shared by multiple clients.

Embodiment 6. The method of embodiment 1, 2, 3, 4, and/or 5, further comprising detecting a degradation of performance with respect to an existing SFC instance.

Embodiment 7. The method of embodiment 1, 2, 3, 4, 5, and/or 6, further comprising replacing the existing SFC instance with a new SFC instance.

Embodiment 8. The method of embodiment 1, 2, 3, 4, 5, 6, and/or 7, further comprising detecting a change in a location of a client and replacing an SFC instance associated with the client with a new SFC instance.

Embodiment 9. The method of embodiment 1, 2, 3, 4, 5, 6, 7, and/or 8, wherein the placement plan accounts for priorities identified in the request, the priorities related to one or more of latency, computational resource capacity, and/or energy consumption.

Embodiment 10. The method of embodiment 1, 2, 3, 4, 5, 6, 7, 8, and/or 9, further comprising representing the hosts as nodes in a graph, wherein the nodes of the graph represents the hosts of the infrastructure and wherein edges of the graph linking the nodes represent links between the hosts of the infrastructure, wherein the links include single links and multi-links, some of which are virtual, evaluating the graph to find hosts suitable for hosting VNFs of a request, wherein the placement plan maps the VNFs of the requests to the hosts of the infrastructure using the graph.

Embodiment 11. The method of embodiment 1, 2, 3, 4, 5, 6, 7, 8, 9, and/or 10, wherein information stored in the nodes and links of the graph include parameters, the parameters including one or more of bandwidth for each link, transmission delays, loss rates, users, resources of each host, processor capacity of each node, resources available at each host, memory available at each host, list of VNF images at each host, VNF types, or combination thereof.

Embodiment 12. A method for performing any of the operations, methods, or processes, or any portion of any of these, or combination thereof, disclosed herein.

Embodiment 13. A non-transitory storage medium having stored therein instructions that are executable by one or more hardware processors to perform operations comprising the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments and edge-computing environments where one or more of a client, server, or other machine may reside and operate in a cloud or edge environment.

Figure 8:
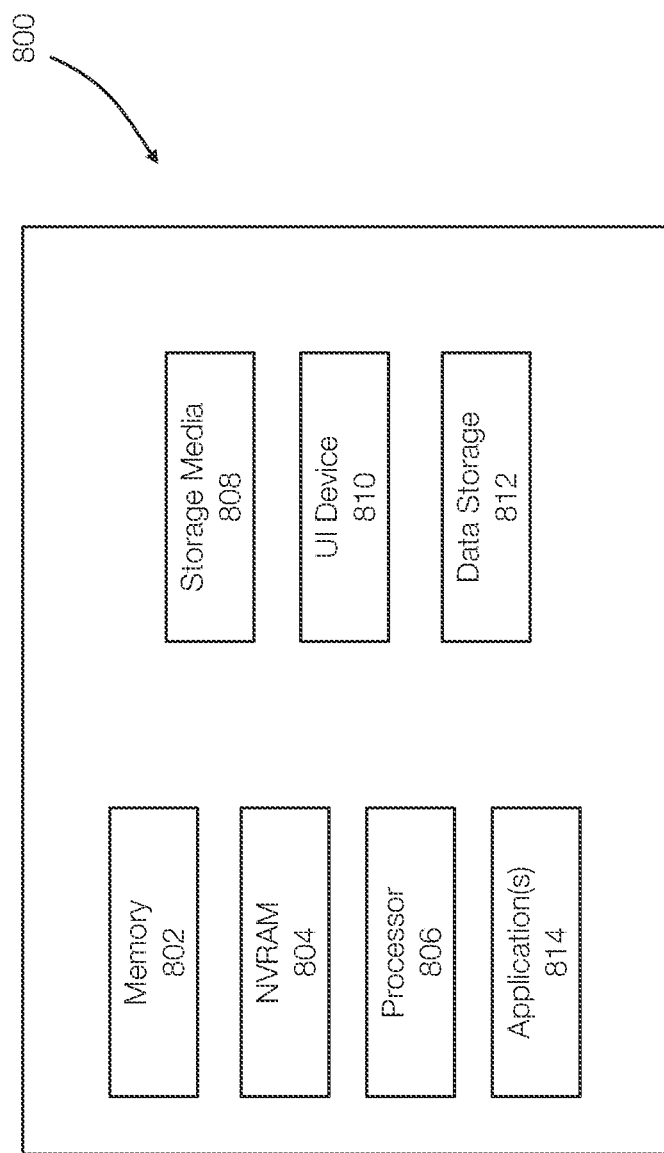
FIG. 8 discloses aspects of a computing device, system, or entity.

With reference briefly now to FIG. 8, any one or more of the entities disclosed, or implied, by the Figures, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid-state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
 receiving requests during a time window from clients, wherein each of the requests is associated with a chain of virtual network functions (VNFs), wherein the virtual network functions are executed in an infrastructure that includes hosts;
 performing a placement operation to generate a placement plan for placing VNFs associated with the requests in the hosts of the infrastructure, wherein the placement plan, wherein the placement operation includes;
  mapping the VNFs of the requests to existing VNF instances operating on the hosts; and
  for VNFs that are not mapped to existing VNF instances, selecting hosts that satisfy the requests and creating new VNF instances on the selected hosts; and
  executing the placement plan to place the VNFs of the requests in the hosts; and
 wherein each of the requests is instantiated as a service function chain (SFC) instance and each of the SFC instances includes a corresponding chain of VNFs,
 detecting a degradation of performance with respect to an existing SFC instance; and
 replacing the existing SFC instance with a new SFC instance.

2. The method of claim 1, further comprising grouping the requests by priority and grouping the requests by the time window.

3. The method of claim 1, wherein some of the SFC instances are shared by multiple clients.

4. The method of claim 1, further comprising detecting a change in a location of a client and replacing an SFC instance associated with the client with a new SFC instance.

5. The method of claim 1, wherein some of VNF instances are shared by multiple clients.

6. The method of claim 1, wherein the placement plan accounts for priorities identified in the request, the priorities related to one or more of latency, computational resource capacity, and/or energy consumption.

7. The method of claim 1, further comprising:
 representing the hosts with nodes in a graph, wherein the nodes of the graph represent the hosts of the infrastructure and wherein edges of the graph represent links between the hosts of the infrastructure, wherein the links include single links and multi-links, some of which are virtual; and
 evaluating the nodes and links of the graph to find hosts suitable for hosting VNFs of a request, wherein the placement plan maps the VNFs of the requests to the hosts of the infrastructure using the graph.

8. The method of claim 7, wherein information stored in the nodes and links of the graph include parameters, the parameters including one or more of bandwidth for each link, transmission delays, loss rates, users, resources of each host, processor capacity of each host, resources available at each host, memory available at each host, list of VNF images at each host, VNF types, or combination thereof.

9. A non-transitory storage medium having stored therein instructions that are executable by one or more hardware processors to perform operations comprising:
 receiving requests during a time window from clients, wherein each of the requests is associated with a chain of virtual network functions (VNFs), wherein the virtual network functions are executed in an infrastructure that includes hosts;
 performing a placement operation to generate a placement plan for placing VNFs associated with the requests in the hosts of the infrastructure, wherein the placement plan, wherein the placement operation includes;

mapping the VNFs of the requests to existing VNF instances operating on the hosts; and for VNFs that are not mapped to existing VNF instances, selecting hosts that satisfy the requests and creating new VNF instances on the selected hosts; and executing the placement plan to place the VNFs of the requests in the hosts; and wherein each of the requests is instantiated as a service function chain (SFC) instance and each of the SFC instances includes a corresponding chain of VNFs, detecting a degradation of performance with respect to an existing SFC instance; and replacing the existing SFC instance with a new SFC instance.

10. The non-transitory storage medium of claim 9, further comprising grouping the requests by priority and grouping the requests by the time window.

11. The non-transitory storage medium of claim 9, wherein some of VNF instances are shared by multiple clients, and wherein some of the SFC instances are shared by multiple clients.

12. The non-transitory storage medium of claim 9, further comprising detecting a change in a location of a client and replacing an SFC instance associated with the client with a new SFC instance.

13. The non-transitory storage medium of claim 9, wherein the placement plan accounts for priorities identified in the request, the priorities related to one or more of latency, computational resource capacity, and/or energy consumption.

14. The non-transitory storage medium of claim 9, further comprising:

representing the hosts with nodes in a graph, wherein the nodes of the graph represent the hosts of the infrastructure and wherein edges of the graph represent links between the hosts of the infrastructure, wherein the links include single links and multi-links, some of which are virtual;

evaluating the nodes and links of the graph to find hosts suitable for hosting VNFs of a request, wherein the placement plan maps the VNFs of the requests to the hosts of the infrastructure using the graph.

15. The non-transitory storage medium of claim 14, wherein information stored in the nodes and links of the graph include parameters, the parameters including one or more of bandwidth for each link, transmission delays, loss rates, users, resources of each host, processor capacity of each host, resources available at each host, memory available at each host, list of VNF images at each host, VNF types, or combination thereof.

* * * * *